March 29, 1960 J. T. BLAKISTONE 2,930,855

CONTROL SYSTEM FOR RECORDING APPARATUS

Filed April 5, 1954 5 Sheets-Sheet 1

INVENTOR.
JAMES T. BLAKISTONE
BY Lyon & Lyon
ATTORNEYS

CONTROL SYSTEM FOR RECORDING APPARATUS

Filed April 5, 1954 5 Sheets-Sheet 2

INVENTOR.
JAMES T. BLAKISTONE
BY Lyon & Lyon
ATTORNEYS

INVENTOR.
JAMES T. BLAKISTONE

BY Lyon & Lyon

ATTORNEYS

INVENTOR.
JAMES T. BLAKISTONE
BY Lyon & Lyon
ATTORNEYS

March 29, 1960 J. T. BLAKISTONE 2,930,855

CONTROL SYSTEM FOR RECORDING APPARATUS

Filed April 5, 1954 5 Sheets-Sheet 5

INVENTOR.
JAMES T. BLAKISTONE
BY Lyon & Lyon
ATTORNEYS

United States Patent Office 2,930,855
Patented Mar. 29, 1960

2,930,855

CONTROL SYSTEM FOR RECORDING APPARATUS

James T. Blakistone, San Marino, Calif.

Application April 5, 1954, Serial No. 421,012
29 Claims. (Cl. 179—100.2)

The present invention relates to improved means and techniques useful in the control of recording means.

The arrangement described herein contemplates the use of a recording medium with, for example, a magnetizable wire or a magnetizable tape, on which intelligence is recorded and then played back or reproduced.

Apparatus of this character is capable of producing generally four functions, namely, a recording function, a play-back or reproducing function, an erasing function accomplished either by itself or simultaneously as a part of the recording function, and fourth, a rewind or back spacing function. Each of these four functions is easily selectable and controlled in accordance with an important feature of the present invention, using for that purpose only a single control element which is conveniently mounted on an associated speaker and microphone housing for convenient access and operation.

By these control means, the apparatus described herein is admirably suited for the more exacting dictation purposes and used as dictation apparatus. Another important feature of the present invention is that the apparatus allows convenient editing of prerecorded material and correction of the same.

Still another feature is that these results may be accomplished conveniently at a remote location from the recorder proper.

The control apparatus described herein is intended to accomplish generally the same purposes as the control apparatus described in my copending patent application, Serial No. 209,251, filed February 3, 1951, now abandoned, although the apparatus described particularly herein uses a magnetizable tape instead of magnetizable wire as described in such copending application, Serial No. 209,251.

Whereas, for dictation purposes, the apparatus described in my copending application, Serial No. 209,251 necessitates the manipulation of two control elements, the present arrangement, in one form thereof is considered to be a distinct improvement in that only one control element instead of two is required to be manipulated, thus facilitating the operation and, more important, minimizing the likelihood of confusion on the part of the operator.

Since the present application includes subject matter which is common to my aforementioned copending application, the present application is being filed as a continuation in part of such copending application Serial No. 209,251.

An object of the present invention is, therefore, to provide an improved control system for apparatus of this character.

A specific object of the present invention is to provide an improved control system which requires only one control element to be manipulated in selecting any one of the four functions indicated above.

Another object of the present invention is to provide an improved control system which minimizes the likelihood of confusion on the part of the operator and allows him to more quickly adapt himself to successful operation of the apparatus.

Another object of the present invention is to provide an improved control system for apparatus of this character in which the controlling means is small and is mounted with the associated microphone at a convenient operating point.

Another object of the present invention is to provide a control system of this character allowing the use of a microphone, not only as a microphone in the recording function, but also as a speaker in the play-back or reproducing function.

Another object of the present invention is to provide improved controlling means, which is not only useable with the particular magnetic tape apparatus described herein, but also useable with the magnetic wire apparatus described in my aforementioned copending application.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 8, 10, 22:
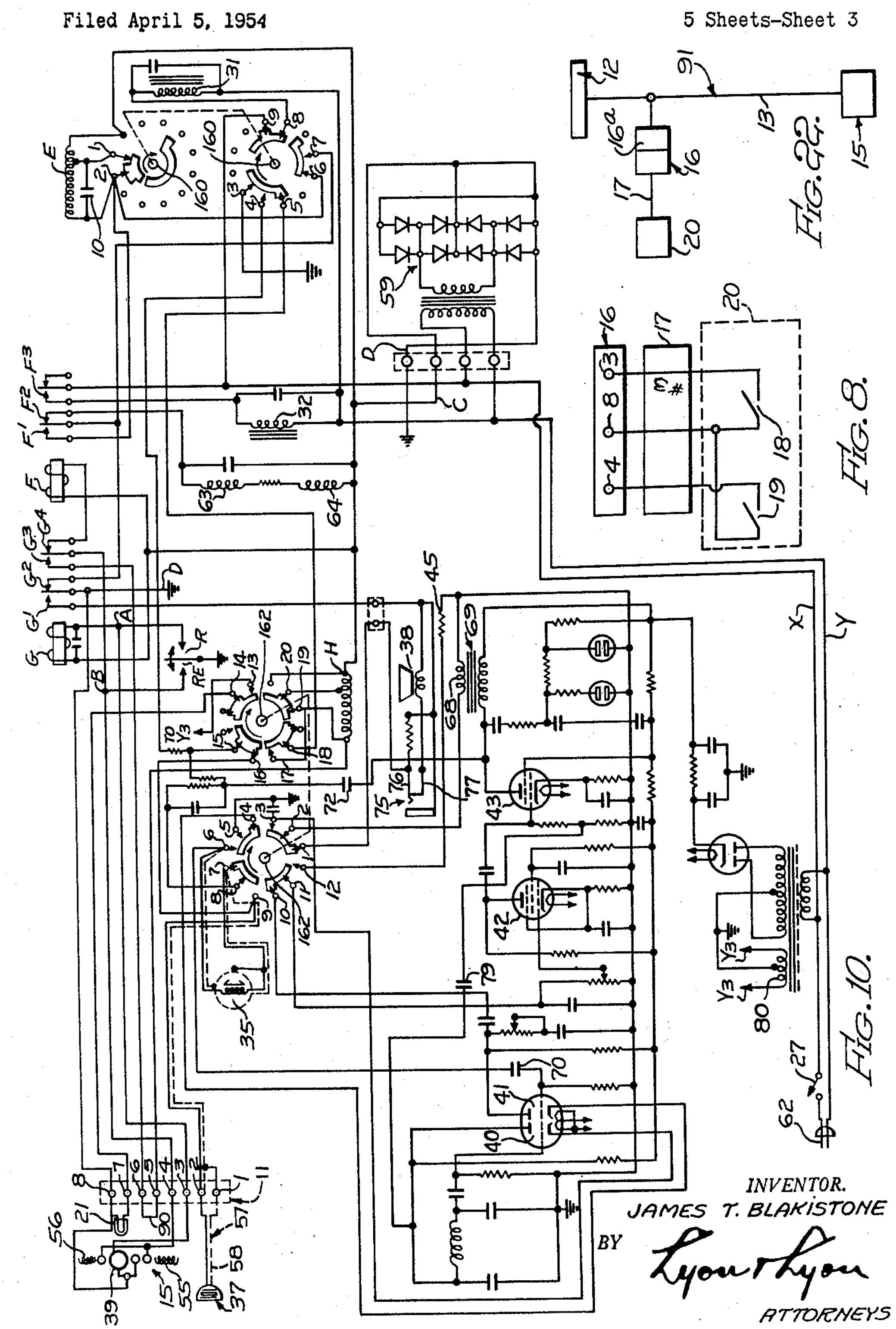
Figure 8 illustrates circuitry of the apparatus shown in Figure 6.
Figure 10 illustrates the electrical circuitry of the machine connected as shown in Figure 1, but with the control knob on the microphone assembly shown in its so-called "run" position.

Figure 22 serves to illustrate other uses to which the present invention may be placed.

Figures 1, 2, 3, 4, 5, 6, 7:
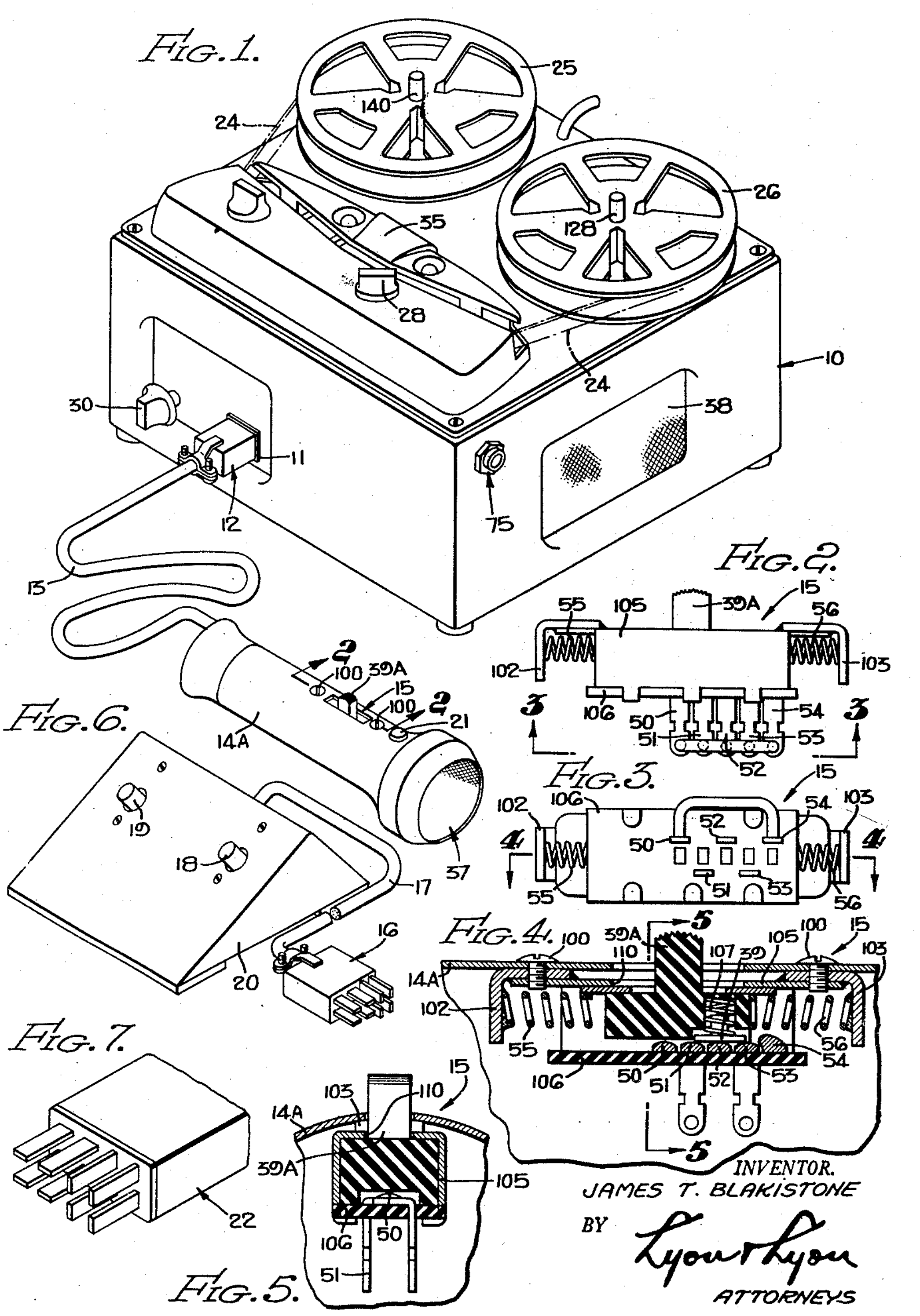
Figure 1 is a perspective view showing a recording and reproducing machine embodying features of the present invention, connected for accomplishing its dictation function.
Figure 2 is a sectional view taken substantially on the line 2—2 of Figure 1.
Figure 3 is a view taken generally in the direction indicated by the line 3—3 in Figure 2.
Figure 4 is a transverse sectional view through the arrangement illustrated in Figure 2 and corresponds generally to a sectional view taken on the line 4—4 of Figure 3.
Figure 5 is a sectional view taken substantially on the line 5—5 of Figure 4.
Figure 6 is a perspective view illustrating the apparatus intended to be substituted for the microphone assembly of Figure 1 for purposes of converting the apparatus to accomplish its transcription function.
Figure 7 is a perspective view showing a so-called erase plug useful in converting the apparatus shown in Figure 1 to accomplish an erase function.
Figures 9, 16, 17, 21, 23:
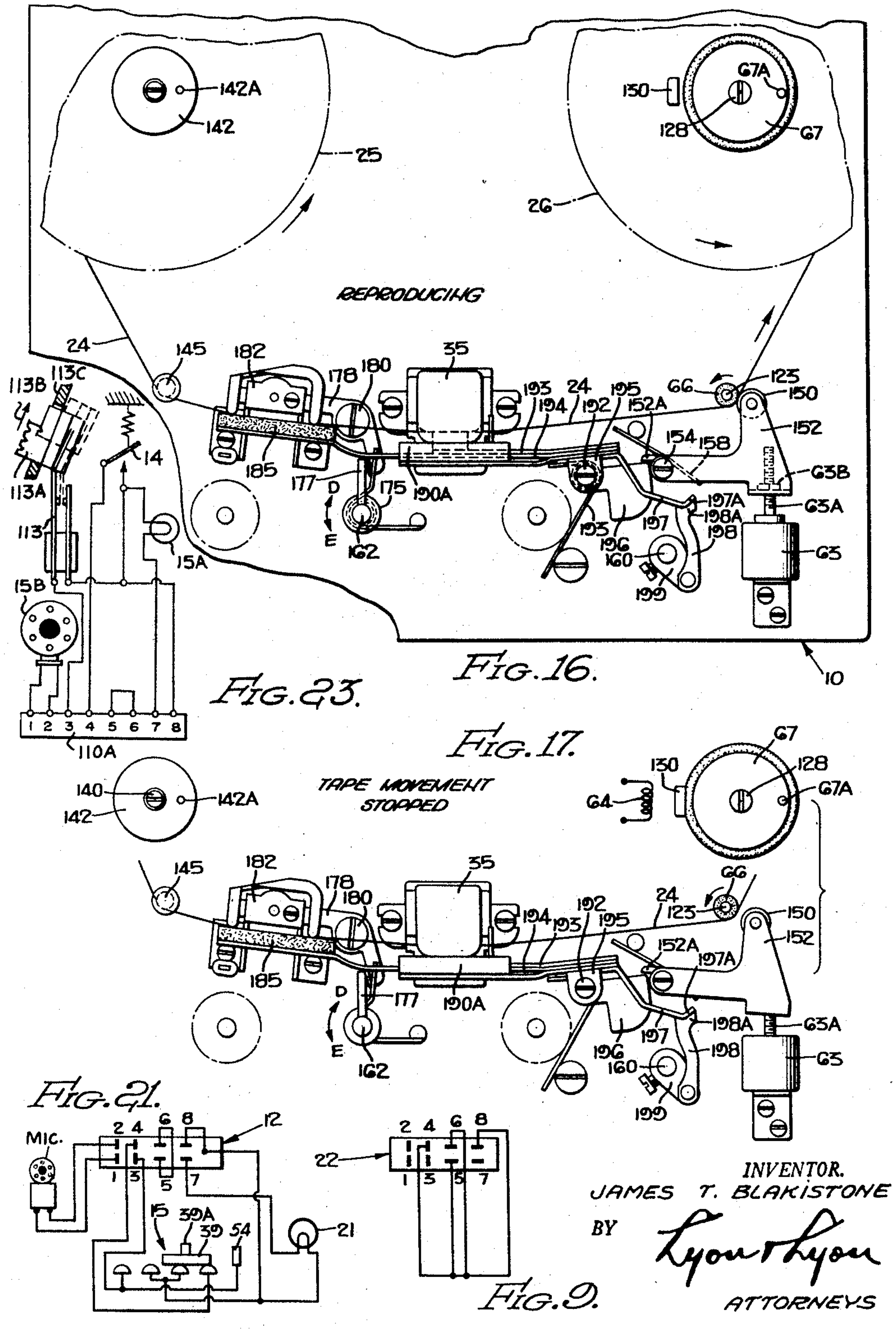
Figure 9 illustrates the circuitry of the apparatus illustrated in Figure 7.
Figure 16 is a top plan view of a portion of the apparatus illustrated in Figure 1, with the top cover removed, and shows the apparatus in condition for reproducing.
Figure 17 illustrates the same apparatus of Figure 16 with the apparatus conditioned, however, for stopping movement of the tape.
Figure 21 illustrates circuit connections in the microphone assembly.

Figure 23 shows a circuit diagram of elements associated with the microphone, at the dictator station, such microphone being connectible to the Jones connector 11 in place of the microphone assembly illustrated in Figure 1, as described herein The apparatus includes broadly a cabinet 10, with a Jones type connector 11 mounted thereon for receiving the plug 12 on one end of the elongated cable 13, the other end of the cable 13 being connected to a microphone in a microphone housing 14A and a special switch 15 mounted on such housing 14A as well as to an indicating lamp 21. Alternatively, the connector 11 may receive the plug 16 (Fig. 6) on the end of a cable 17 which contains wires connected to suitable foot operated forward and reverse switches 18 and 19, respectively, mounted in the housing 20; or such connector 11 may receive the Jones plug 22 (Fig. 7), having different contacts thereof permanently connected together so that an erase function simultaneously with a rewind function may be accomplished by merely inserting the Jones plug 22 in the connector 11.

In general, when it is desired to accomplish the function of dictation the plug 12 of cable 13 is inserted in the connector 11 and, it is understood that the term dictation function includes not only the aforementioned function of recording, but also the function of play back or reproducing, as well as the function of rewinding or back spacing, or the function of erasing, either with or without recording, for example, for editing purposes. In other words, by use of the assembly connected to cable 13, an operator is provided with all means required for successful recording, reproducing, and editing or correction of the recorded material.

In general, the cable 17 (Fig. 6) is used with the plug 16 thereof inserted in the connector 11, only when the apparatus is being used for transcription purposes, and the connections are such that it is impossible for the transcriber to erase, either accidentally or intentionally although it is possible for the transcriber to control the movement of the recording medium in its movement either in the forward direction or in the reverse direction in achieving the play back or reproducing function, or alternatively, the rewind or back spacing function.

The other third control which may be inserted in the connector 11 is the aforementioned Jones plug 22 (Fig. 7), which as indicated above, when inserted in the connector 11 automatically causes the recording medium to be rewound and also to be erased, and since it accomplishes these general purposes, the plug 22 is referred to descriptively as an erase plug.

The apparatus mounted in and on the cabinet 10, is to a large part conventional, being a modification of the model 731 tape recorder manufactured by Ampro Corporation of Chicago, Illinois. For purposes of simplifying the disclosure, the conventional mechanism used in driving the tape either in the forward direction (during either the recording or play back function) or the reverse direction (in rewinding) is not described in detail. Such mechanism involves a so-called "run" motor and a so-called "rewind" motor, a brake solenoid and a pressure roller disengaging solenoid connected in an electrical circuit, which, however, is described in detail herein.

It is understood that the terms rewind and back space, as used herein, are considered synonymous, in that both refer to movement of the recording medium relative to a reproducing head in those instances where it is desired to bring such reproducing head adjacent certain desired prerecorded material on the recording medium. The recording medium as described in my aforementioned copending application may be a magnetizable wire or as shown specifically herein, a magnetizable tape, and while the apparatus described herein specifically employs a conventional one quarter inch tape, it is understood that the invention is applicable also to other arrangements using, for example, tape having a width of three or more inches, and wherein comparable back spacing is accomplished by producing relative movement between the reproducing head and the tape in either the transverse or lateral direction of such tape.

In general, the cabinet 10 includes apparatus for transporting magnetizable tape 24 from a supply spool 25 to a take-up spool 26 at a relatively slow speed during the recording and play-back functions, and for reversing the direction of tape travel whereby the tape may be reeled from the spool 26 to the other spool 25 at a relatively high speed during the rewind or back spacing or rewind-erase function, such rewind-erase function being produced when the erase plug 22 (Fig. 7) is inserted in the Jones connector 11.

The machine is energized by operation of an on-off switch 27 connected in the power line as shown in Figure 10, switch 27 being controlled by the knob 28 (Figure 1), rotation of which also in conventional manner serves to control the volume or level of the sound being recorded or of the sound being played back, as the case may be.

Figure 11:
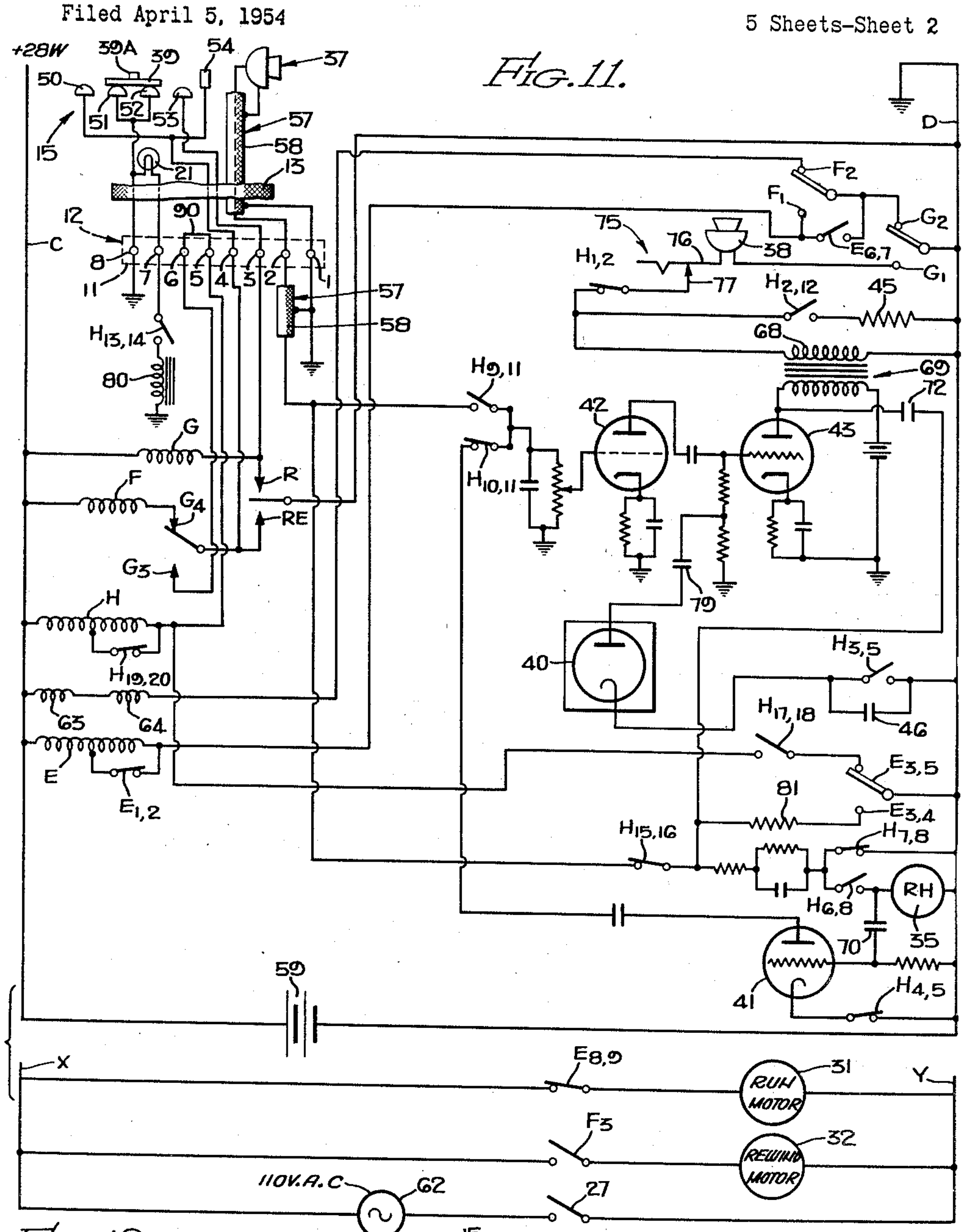
Figure 11 shows the circuitry of Figure 10 in more simplified form with, however, the control knob on the microphone assembly in its so-called "off" position.

The knob 30 (Fig. 1) provides some limited local control of the recorder, such knob 30 serving to control the position of a single pole double throw switch designated as "R" and "RE" in Figure 11. In general, closure of the switch R (with the on-off switch 27, Figure 1, closed) results in the tape 24 being moved in its forward direction with the sound on the tape being reproduced; and closure of the other switch RE results in rewinding or back spacing of the tape during which a muted sound is heard through the microphone acting as a speaker, and such back spacing is accomplished without erasing. This muted sound, or "Donald Duck" effect serves as an indication to its operator of the amount of backspacing accomplished and is particularly useful when the operator is remotely located with respect to the recorder.

For purposes of moving the tape 24 in the forward direction, the "run" motor 31 is energized, and for purposes of transporting tape in the opposite direction, the so called rewind motor 32 is provided, being connected as illustrated in Figures 10 and 11.

The apparatus includes a pilot so called "run" relay which has the coil G. Also, a so called "rewind" pilot relay, having the winding F, is provided for controlling the energization of the rewind motor 32 and for other purposes described later.

The pilot relay having winding F controls, under certain conditions, energization of the so called run-rewind rotary relay having the winding E. Another relay incorporated in the system is the so called listen-record rotary relay H which is energized during the record function and also when erase plug 22 is used.

The relay winding H is de-energized during the playback function and is energized during the record function, and similarly, the winding E of the rewind relay is de-energized in the run condition of the apparatus but is energized during the rewind or back space function, and also in the "stop" position when moving from "rewind"

to "stop" to maintain the tape channel open to permit threading or removal of the tape, as desired.

For purposes of simplicity and convenience, the windings of the various relays are identified by a characteristic letter as described above and the associated switches, actuated when the corresponding windings are energized, are designated by the identical letter with numerals appended thereto. Thus, when relay winding G is energized, the associated relay switches G1, G2, G3 and G4 are operated. And, similarly, when the relay winding F is energized, the switches F1, F2 and F3 are operated.

It is noted that in the practical wiring diagram illustrated in Figure 10 the relays having the windings E and H are each rotary type relays with each having a pair of rotatable wafer switches ganged together as indicated by the dotted lines and rotatable in the clockwise direction when the corresponding windings E and H are energized, as designated by the clockwise extending arrows associated with the various wafers and switches.

The use of rotary wafers of this character is deemed to involve a matter of choice and convenience and it is understood, of course, that other types of relays may be used to accomplish the various switching functions enumerated below. Figures 10 and 11 both show switches associated, respectively, with windings E and H in the normal position they assume when such windings E and H are de-energized.

For purposes of simplicity and convenience, the various switches actuated when the corresponding windings E and H are energized are designated by the corresponding letters E and H but with numerals appended thereto. These particular numerals are the numbers of the contacts of the particular switches. Thus, for example, stationary contacts 1 and 2 associated with the winding E, and which are short circuited by one of the rotary wafer contacts, are designated as the switch E1, 2. Following this nomenclature, it is noted that the relay having the winding E has the following switches, namely, normally closed switch E1, 2; the normally closed switch E3, 5; the normally open switch E3, 4; the normally closed switch E8, 9; and the normally open switch E6, 7.

The rotary relay having the winding H has the following switches: the normally closed switch H1, 2; the normally open switch H2, 12; the normally open switch H3, 5; the normally closed switch H4, 5; the normally open switch H6, 8; the normally closed switch H7, 8; the normally open switch H9, 11; the normally closed switch H10, 11; the normally open switch H13, 14; the normally closed switch H15, 16; the normally open switch H17, 18; and the normally closed switch H19, 20.

The term normally closed has reference to the fact that the switch is closed when the associated winding is de-energized and, similarly, the term normally open signifies that the switch is open when such corresponding winding is de-energized.

These various switches designated above produce control operations now described in connection with Figures 10 and 11 wherein it is assumed that the Jones plug 12 on the end of the so called microphone cable 13 is inserted in the cooperating Jones plug 11 on the cabinet 10 (Figure 1).

In general, transducer 35, a conventional record and reproducing head, during the recording function, is energized in accordance with currents developed in the microphone 37, such voice currents being first amplified in tubes or stages 42 and 43 before being applied to the coil of the transducer 35; and during the play-back function voltages induced in the coil of the transducer 35 are amplified in the tubes or stages 41, 42 and 43 in succession before being applied to the speaker 38. The circuitry for accomplishing these indicated results is automatically selected and controlled by a single manipulatable switching element contactor or contact bar 39 which is a part of the aforementioned switch 15.

This switch 15 is a special type of slide switch, having an elongated slidable contact bar 39 movable in its longitudinal direction by a single control knob or insulated projection 39A extending outwardly therefrom. This contact bar 39 is engageable with the stationary switch contacts 50, 51, 52, 53, and 54. These contacts 50–54 are disposed in line, and any two successive contacts may be bridged by the contact bar 39, but one of the end contacts, namely contact 54 is positioned sufficiently close to contact 53 to allow bridging of contacts 52, 53, and 54.

An important feature of this particular switch 15 is that a pair of springs 55 and 56 (Fig. 4) are disposed at opposite ends of movement of the elements 39 so as to be capable of biasing the switch element 39 away from the corresponding outside stationary contacts 50 and 54. It is essential that the operator apply sufficient force on the switch extension 39A to overcome the resistance offered by the springs 55 and 56 when it is desired to make contact, respectively, with the outside stationary contact 50 or the other outside contact 54, as the case may be. Preferably, the spring 56 is stronger than the spring 55 because it is desired to required a more definitive action on the part of the operator to condition the apparatus for recording inasmuch as the recording function involves erasing. This is particularly preferable since the contactor 39 is required to be moved a shorter distance in effecting the record function than is required in effecting the rewind function. In other words, the springs 55 and 56 serve as means normally preventing the slidable contact 39 from engaging, respectively, the contact 50 and the contact 54. The switch contact 39, however, may rest in either one of two positions, namely, a first position wherein the contact 39 is engageable only with the contacts 51 and 52, and a second position wherein the contact 39 bridges the contacts 52 and 53.

The outside stationary switch contacts 50 and 54 are each connected to contact 3 on the Jones plug 12 which, of course, corresponds with the contact 4 on the Jones connector 11. The contacts 51 and 52 are connected to contact 8 on the Jones connector 11 which, of course, corresponds to contact 8 on the Jones connector 11, such contact 8 being grounded. Similarly, the contact 53 is connectible with the contact 4 on the Jones plug 12.

The microphone 37 has one of its terminals connected to the sheath 58 of cable 57, such sheath being connected to contact 1 on the Jones plug 12, while the center conductor of the shielded cable 57 is connected to contact 2 of the Jones plug. This shielded cable 57 together with other connectors extending to the aforementioned switch contacts as well as the connectors connected to the indicating lamp 21, all comprise a single composite cable 13.

It is noted that the sheath 58 of cable 57 is grounded when the plug 12 is inserted in the connector 11.

The aforementioned relays each have so called 28 volt coils energizable from a 28 volt source 59, which is connected to the leads C and D.

In general, positioning of the contactor 39 to bridge the stationary contacts 52 and 53 results in accomplishing a "run" function, i.e., the tape is being transported in its forward direction either in accomplishing the reproducing function or the recording function, depending upon the particular condition of the apparatus at the time of movement of such contactor 39. In other words, such movement of the contactor 39 from its position shown in Figure 15 to its position shown in Figure 12 produces different results depending upon prior operation as described more fully hereinafter. In general, if the apparatus were previously conditioned for recording, occasioned by first producing contact between the contactor 39 and the outside contacts 52, 53, and 54 simultaneously, then the condition represented in Figure 12 corresponds to a recording function; but if there were no previous engagement between contactor 39 and the outside contact 54 the condition represented in Figure 12 corresponds to a reproducing or play-back function.

Figures 12, 13:
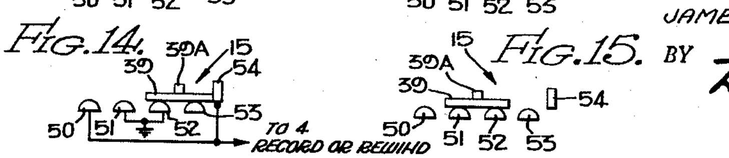
Figure 12 illustrates the position of the microphone movable switching element, which is mounted on the microphone assembly in its so-called "run" position, corresponding to the run position of the same element illustrated in Figure 10.
Figure 13 shows the position of the adjustable contactor in its so-called rewind or back spacing position.

When the contactor 39 is moved to a position indicated in Figure 13, the rewind or back spacing function is being accomplished; and this is true regardless of the previous condition of the apparatus, i.e., whether or not there was previous engagement between the contactor 39 and the other outside terminal 54. The condition for achieving back spacing is indicated in Figure 13 and it is observed that the contactor 39 is maintained in such position only so long as the operator exerts sufficient force to overcome the action of the spring 55 (Figure 4).

Figures 14, 15:
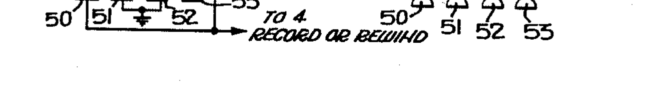
Figure 14 illustrates the position of the control after it is moved to accomplish a record function.
Figure 15 illustrates the position of the contactor in its off position, i.e., the same position illustrated in Figure 11.

Figure 14 indicates the position to which the contactor 39 must be moved to simultaneously engage contacts 52, 53, and 54 to condition the apparatus for recording and here again, such contactor 39 remains in that position only so long as sufficient force is being exerted on knob 39A to overcome the action of the spring 56 (Figure 4). However, once the condition illustrated in Figure 14 is achieved, the apparatus remains in condition for recording even though the contactor 39 is allowed to assume the position illustrated in Figure 12; further, the apparatus remains in condition for recording even though the contactor 39 is moved to the position indicated in Figure 15, illustrating the condition wherein there is no tape movement. Once the apparatus is in condition for recording, it remains in such condition and the movement of the tape may be either stopped or started in a forward direction by respectively moving the contactor 39 to the position illustrated in Figures 15 and 12.

In order to reproduce the recorded material it is, of course, necessary for the reproducing transducer (whether it is the same transducer which effected the recording or a separate transducer used only for reproducing purposes) to detect the recording on the medium, i.e., it is necessary that the particular portion of the recording having particular material that is desired to be reproduced, be passed, during the reproducing process by the transducer in the direction and at the approximate speed at which the recording was made. This requirement necessitates a "back space" or "re-wind" function preparatory to the desired reproduction. During this back space operation or function, it is necessary that the erasing means be prevented from erasing the prerecorded material during the back spacing operation.

An important feature of the present arrangement shown herein and in my above mentioned copending application is that immediately upon entering the rewind or back space function not only is the erasing means disabled but also the apparatus is automatically conditioned for reproduction. Although it is preferred to condition the apparatus for reproduction at the beginning of the rewind operation, for reasons which are outlined below, it would suffice, in achieving broader aspects of the present invention, to only disable the erasing means during the rewind operation and to condition the apparatus for reproduction immediately after the rewind operation has been completed. In either case, the apparatus reproduces the recording automatically upon forward movement of the recording medium.

Thus, once the machine is conditioned for recording and a recording is made, it may be automatically changed for reproducing by first going into the intermediate stage of back spacing, i.e., moving the contactor 39 to the position illustrated in Figure 13. This also means that after completion of the back spacing operation, the machine is automatically conditioned for reproduction. This operation is considerably highly desirable, i.e., the automatic transition from the condition of back spacing to the condition of reproduction.

Now that the operation of the microphone switch 15 has been described generally, specific circuitry is now described in detail in connection with Figures 10 and 11.

The run motor 31 is controlled by the run-rewind relay winding E; and similarly the rewind motor 32 is controlled by the rewind relay coil F.

The motors 31 and 32 are alternating current motors energized from the alternating source 62 through the on-off switch 27, such motors being selectively energized by the control circuit.

It is noted that when the switch 27 is closed, the run motor 31 is energized through the normally closed switch E8, 9 and it is presupposed that at this stage contactor 39 is in the position shown in Figure 15 and switches R and RE are open and coils E and H are de-energized. However, the take-up spool 26 (Figure 1) is not at this time being driven, de-energization of the pressure roller retracting solenoid 63 (Figure 18) and the brake solenoid 64 (Figure 20) being required to transport the tape in its forward direction.

These solenoids 63 and 64 associated with the take-up spool 26 are normally energized through a series circuit which includes the normally closed relay switches F2, G2 and solenoids 63 and 64. Once this particular series circuit is interrupted, by opening of switch G2 the tape is caused to move in its forward direction using the mechanism described later in connection with Figures 16–20. The switch G2 is actuated upon energization of the corresponding run coils G.

The run relay coil G may be energized either locally at the cabinet 10 by closing the switch R or remotely by moving the contactor 39 to the position illustrated in Figure 12. In either case one terminal of the relay coil G is grounded to actuate the associated relay switches G1, G2, G3, and G4. In this particular condition, when the normally open switch G1 is closed, a ground return is provided for the speaker 38 so that sound may be reproduced in accordance with voltages induced in the secondary winding 68 of the audio output transformer 69. This switch G1 is provided to prevent the reproduction of amplifier noises and the like when the tape is stationary. Opening of the switch G2 causes the solenoid 63 and brake solenoid 64 to be de-energized to thereby allow the tape to move forwardly. Closing of the normally open switch $G_3$ serves to connect one terminal of the coil H to the Jones plug contact 4 and thus to the switch contact 54 to thereby condition an energizing circuit for such coil H. This circuit includes the coil H, the contact 5 on the Jones plug 12, the jumper between contacts 5 and 6 on such plug, the switch G3, the contact 4 on the Jones plug 12, and contact 54, which contact as described later is connected to ground subsequently upon movement of the contactor 39. Opening of switch G4, an interlock type of switch, prevents simultaneous energization of coils G and F.

With switch R closed, or with contactor 39 in the position illustrated in Figure 12, movement of the tape past the transducer 35 results and, assuming that the tape has prerecorded material thereon, voltages are developed in such transducer 35 and such voltages are applied through condenser 70 to the control grid of tube 41 for amplification. Voltages are successively amplified in the stages 41, 42, and 43 with the output being applied to the output transformer 69. It is noted that under this particular condition, the tube 41 is in operative condition since its cathode is grounded through the normally closed switch H4, 5; and, further, the anode of tube 41 is coupled to the control grid of tube 42 through the normally closed switch H10, 11. Further, it is observed that the voltage developed on the anode of tube 43 is applied to the microphone 37 which, at this time, acts as a speaker. Specifically, the anode of tube 43 is coupled to the microphone 37, acting as speaker, through a path which includes the condenser 72, and the normally closed switch H15, 16 contact 2 on the Jones plug and the speaker 37. Thus, the operator may hear the sound emanating from speaker 38 as well as the sound emanating from the microphone 37, acting as a speaker. Sound is heard from the speaker 38 since it is connected to the secondary winding 68 of transformer 69 through the switches H1, 2, jack 75, and switch G1, the primary winding of such transformer 69 being connected in the anode-cathode circuit of tube 43. If desired, the speaker 38 may be disconnected by inserting an insulating member into the jack 75 to separate the contacts 76 and 77 of such jack, thereby interrupting the circuit otherwise extending through the speaker 38. Thus, under these conditions, the operator hears the assumed pre-recorded material on the tape being reproduced by the microphone 37 acting as a speaker.

The operator may desire to correct the pre-recorded material. This he may conveniently do by moving contactor 39 to the position illustrated in Figure 14 before the material to be corrected is heard. At the instant the contactor assumes the position shown in Figure 14, the apparatus goes into its record function, the speaker is simultaneously silenced and the apparatus serves to record those words spoken into the microphone 37. In this procedure, the newly recorded material follows the final word heard at the termination of the reproducing function. This means that the corrected material is erased and supplanted by the newly recorded material.

The recording function, as described herein, involves erasing of any material which may have been previously recorded and the application of both a high frequency biasing current and those amplified currents representing words spoken into the microphone 37 to the transducer 35. By thus moving the contactor 39 into engagement with the contact 54, while, of course, maintaining contact between contactor 39 and contacts 52 and 53 as indicated in Figure 14, the coil H of the so-called listen-record relay is energized through a circuit which includes the high voltage conductor C, the coil H, the Jones plug contacts 5 and 6, the switch G3, the contact 54, the contact 4 of the Jones plug, the contactor 39, the contact 52, and the grounded terminal 8, which is connected to the grounded lead D. When coil H is thus energized, the series of H switches, 12 in number, are actuated and the results of actuation of such switches is now described in detail.

Opening of the normally closed switch H1, 2 interrupts the circuit otherwise extending through the speaker 38, thereby muting the same. Closing of the normally open switch H2, 12 substitutes the load resistance 45 for the load previously offered by the speaker 38. Closing of the normally open switch H3, 5 serves to connect the cathode of the high frequency oscillator to supply high frequency biasing currents to the transducer 35. For that purpose, the anode of tube 40 is coupled by condenser 79 to the control grid of tube 43, at which there is a mixture of such high frequency oscillator voltage with voltage variations produced by talking into the microphone 37, using circuitry described in more detail below.

Opening of the normally closed switch H4, 5 interrupts the cathode return circuit of tube 41, thereby disabling the operation of tube 41. Closing of the normally open switch H6, 8 completes a circuit from the ungrounded terminal of the transducer 35 to the anode of tube 43, through condenser 72, so that such transducer 35 has applied thereto those voltage variations developed on the anode of tube 43. Opening of the normally closed switch H7, 8 interrupts a load circuit previously connected to the anode of tube 43 for compensating purposes. Closing of the normally open switch H9, 11 serves to provide a connection between the ungrounded terminal of microphone 37 and the control grid of tube 42 so that voltage variations produced by the microphone 37 may be applied with the aforementioned high frequency signals to the control grid of tube 43. Opening of the normally closed switch H10, 11 interrupts the coupling between the anode of the disabled tube 41 and the control grid of tube 42. Closing of the normally open switch H13, 14 serves to connect an ungrounded terminal of the transformer secondary winding 80 to the ungrounded terminal of the indicator lamps 21 to provide an indication at the microphone indicating that the apparatus is in condition for recording. Opening of the normally closed switch H15, 16 interrupts the coupling theretofore existing between the ungrounded lead of microphone 37 and the anode of tube 43. Closing of the normally open switch H17, 18 is of particular importance since this switch H17, 18 acting as a sealing switch serves to maintain the coil H in its energized condition through a circuit which includes such coil H, the switch H17, 18 and the switch E3, 5, regardless of the fact that the contactor 39 may be allowed to move from its position illustrated in Figure 14 to its position illustrated in Figure 12. In other words, the switch H17, 18 is a so called holding switch and maintains the apparatus in condition for recording even though the tape may be stopped and started for forward movement by manipulation of switch 39 between the positions illustrated in Figures 15 and 12. Opening of the normally closed switch H19, 20 opens a short circuit theretofore existing across some of the turns of the coil H to limit the resulting steady state current flowing therethrough.

The apparatus thus remains in condition for recording as long as the aforementioned switches H17, 18 and E3, 5 are closed. Should there be a power failure in source 62, occasioned as, for example, when the machine shown in Fig. 1 is disconnected from the household mains for transportation to a different location, then the relay winding H is no longer energized through its holding or sealing switch H17, 18 and the apparatus automatically returns from a recording condition to a reproducing condition. This is desirable since there is no likelihood that erasure will subsequently be produced when power is reapplied to the apparatus. In order to get the apparatus out of its recording condition, it is necessary (in the absence of a power failure condition mentioned above) to open the switch E3, 5 and this is accomplished by energization of the associated relay coil E. This coil E is energized for this purpose by moving the contactor 39 to its back space position illustrated in Figure 13, in which case the tape is rewound or back spaced so long as manual effort is being applied to the contactor 39 to maintain its position illustrated in Figure 13. When the manually applied force on contactor 39 is relieved, contactor 39 assumes the position illustrated in Figure 15 where there is no tape movement (the solenoids 63 and 64 (Figures 19 and 20) being de-energized) but a transition has occurred in that the apparatus is no longer in condition for dictation but is automatically in condition for reproduction; and as a matter of fact, reproduction may thereafter take place by manually moving the contactor 39 from its position shown in Figure 15 to its position illustrated in Figure 12. It is noted that in the above transition, to rewind, the coil G is de-energized and energization of the coils F and E and actuation of the associated E switches is produced.

In the course of movement of the contactor 39 to its rewind position illustrated in Figure 13, the contactor 39 leaves the contact 53 to thereby cause coil G to be de-energized with the result that relay switch G4 is allowed to close. Closing of switch G4 results in energization of coil F and actuation of associated switches F1, F2, and F3.

Closing of the normally open switch F1, causes the coil E to be energized through a circuit which includes coil E, switch F1, and switch F2. Opening of the normally closed switch F2 results in de-energization of coils 63 and 64 to allow the tape to be rewound under controlled conditions as described later. Closing of the normally open switch F3 results in energization of the rewind motor from source 62 through a circuit which includes, source 62, switch 27, motor 32 and switch F3.

Energization of the aforementioned coil E results in actuation of the associated switches E1, 2; E3, 5; E3, 4; E6, 7; and E8, 9.

Opening of the normally closed switch E1, 2 opens a short circuit previously existing around a portion of such coil E to limit the resulting steady state current flowing therethrough. Opening of the normally closed switch E3, 5 interrupts the previously defined holding circuit for the H coil, thereby allowing the H coil to be de-energized. Closing of the normally open switch E3, 4 serves effectively to return the ungrounded terminal of the microphone 37 to ground, thereby greatly reducing the intensity of the sound heard over the microphone 37 acting as a speaker during this rewinding operation when coil E is energized. In other words, closure of switch 34 closes a circuit extending from the anode of tube 43, condenser 72, resistance 81 and ground with the voltage developed across resistance 81 being relatively small. Preferably, the resistance 81 which is connected in the circuitry has a resistance so that some of the so called "Donald Duck" sound may be heard by the operator at the microphone, but with greatly diminished intensity. By these means, the operator gains knowledge as to when all of the prerecorded material has been rewound on the tape on the supply spool 25. Opening of the normally closed switch E8, 9 opens a circuit to the run motor 31. Closing of the normally open switch E6, 7, which is in shunt with switch F1 assumes continued energization of coil E.

After the rewind operation, i.e., after the contactor 39 is allowed to move out of engagement with the contact 50 under the influence of spring 55 (Figure 4), the energization circuit for coil F is interrupted, such energization circuit theretofore existing comprising the coil F, the switch G4, the contacts 4 on the Jones plug 12, the contact 50, contactor 39 and ground. This de-energization of coil F does not effect the energization of coil E since the aforementioned switch E6, 7 in the nature of a sealing switch is in parallel with the switch F1 and, thus, coil E remains energized through a circuit which includes coil E, switches E6, 7 and G2. At this particular time, represented by the condition illustrated by the position of the contactor 39 in Figure 15, the apparatus is in condition for reproducing although the tape is not being moved in the forward direction. The movable mechanical elements of the tape channel from guide post 145 (Figure 20) to capstan 66 are held open by virtue of this holding circuit for coil E after coil F has been de-energized. To thereafter cause the tape to be moved forwardly so as to reproduce the pre-recorded material, the contactor 39 is moved from its position shown in Figure 12. This energizes coil G and opens switch G2 which in turn de-energizes the coil E and allows run-rewind relay E to return to its unenergized condition. This couples the tape to the forward drive as described above. The operator may, thus, listen to the pre-recorded material and is in a position, any time, to start the recording function by moving the contactor 39 from the position shown in Figure 12 to the position illustrated in Figure 14, to obtain energization of the various recording circuitry as described above.

The circuitry illustrated in Figures 10 and 11 is described above in connection with operation when the Jones plug 12 of the microphone cable 13 is inserted in the cooperating Jones connector 11 mounted on the cabinet 10.

A feature of the present invention is that the wiring of the various accessories, namely, the microphone 15 illustrated in Figure 1, the foot switch illustrated in Figure 6 and the erase plug 22 illustrated in Figure 7, is such that only those functions required by the duties of the particular operator may be accomplished by his accessories, and other functions not necessary or apt to create confusion are denied to the operator. This minimizes the chance of accidental errors or erasures. Thus, for example, use of the foot switch shown in Figure 6 permits the operator or transcriber to accomplish the reproducing function and also the rewinding function, but denies or prevents the accomplishment of an erase function or recording function. This is true even though the recorder may have been left in the "record" condition by the dictator. Use of erase plug 22, shown in Figure 7, requiring as it does a specific act of definite volition on the part of the operator, allows only rewinding and simultaneous erasure of the material on the tape but denies or prevents the operator from performing the reproducing function or dictation function while it is inserted.

The connections to the Jones plug 11 on the cabinet 10 thus allows a great degree of control versatility and adaptation for accomplishing these results, while offering comparable protection to the operators against accidental operator caused misfunction.

A feature of the microphone assembly is that contacts 5 and 6 of the Jones plug 12 are interconnected to allow the operator to accomplish the dictation function. Such connection or jumper 90 between the contacts 5 and 6 of plug 11 is lacking in the connection to the plug 16.

If desired, all the functions of dictation may be accomplished using the foot switch connected as illustrated in Figure 22 wherein the Jones plug 12 is connected to the microphone assembly 15 in the same manner illustrated in the previous figures, but for the present purposes, the contactor 39 is allowed to remain in its off position shown in Figure 15. However, an additional female type Jones connector 16A has different contacts thereof connected to wires in the cable 13. These connections are such that the previously mentioned foot switch, having the cable 17 and Jones plug 16, may be interconnected with such wires in the cable 13. In such case, the foot switch on the cabinet 20 is connected in the same manner as illustrated in Figure 8, with the switch 18 bridging the contacts 3 and 8, and the switch 19 bridging the contacts 4 and 8. Contacts 3, 4, and 8 of the Jones connector 16A are connected through the Y type of connection 91 to corresponding contacts 4, 8, and 3 on the plug 12. Using this arrangement shown in Figure 22, the operator makes use, of course, of the microphone in the assembly 15 as well as the indicating lamp 21, the microphone being used also as a speaker, but all control functions are performed by operation of the foot operated switches 18 and 19. The arrangement is such that with the machine turned on, i.e., the switch 27 (Figures 10 and 11) closed, foot operation of switch 18 results in forward movement of the tape. Such closure of switch 18 in Figure 8 may correspond either to reproduction or to recording, depending upon whether or not the switch 19 was previously actuated. Closing and opening of the switch 18 results in starting and stopping of the tape, respectively, in the reproducing or recording function, as the case may be. Assuming that the apparatus is in the reproducing function, the conversion may be simply made to the dictation function by momentarily closing switch 19 while maintaining switch 18 closed. For that purpose, the switches 18 and 19 are preferably mounted sufficiently close so that they may be bridged by the sole of the operator's shoe and closed simultaneously. In order to accomplish the rewind function, only the switch 19 is operated. These results flowing from the use of the two controls 18 and 19 are exactly the same results accomplished by the two comparable control switches described in my aforementioned copending application.

As a matter of fact, a microphone cable assembly terminating in the Jones plug 110A, as illustrated in Figure 1A of my abovementioned copending application, and also in Figure 23 herein, may be inserted into the Jones connector 11 on the cabinet 10 to produce the same control system, as described in such copending application. In this respect, it is noted that the various contacts 1, 2, 3, 4, 5, 6, 7, and 8 on such plug 110A in Figure 1A of my copending application, and also in Figure 23 herein, correspond, respectively, to connectors 1, 2, 3, 4, 5, 6, 7 and 8 on the connector 11 in this instant application. In other words, the three control elements described in Figures 1A, 1B and 1C in my copending application are interchangeable with the corresponding control elements shown in this instant application in Figures 21, 8 and 9, respectively, for producing the same general functions.

In the above modification illustrated in connection with Figure 8, the switch 19 of the foot switch assembly 20 corresponds to the switch 14 in Figure 1A of my copending application, since both of these switches are connected to contacts 4 and 8 of corresponding Jones plugs; and switch 113 in Figure 1A of my copending application, and also in Figure 23 herein, corresponds to the switch 18 of the instant application since the switches being compared are each connected to contacts 3 and 8 of the corresponding Jones plug.

When the plug 110A of Figure 23 has its contacts 1–8 connected to correspondingly numbered contacts 1–8 of the connector 11 in either Figures 10 or 11, the apparatus may be operated by manipulating the switches 113 and 14. Switch 14 serves generally two functions, namely, in one set of conditions, to effect a rewind operation and, in a second set of conditions, to cause establishment of a holding circuit in the recording function. Switch 113 serves generally to energize the tape transport mechanism for moving the tape forwardly for either reproduction or recording.

Thus, when switch 113 is closed, the contacts 3 and 8 on the Jones connector 11 are bridged and the run relay coil G is energized to effect the same operation and produce the same results which are obtained when the contactor 39 in Figure 12 bridges the contacts 52, 53. Switch 113 in Figure 23 is thus equivalent to switch 39, 52, 53 in Figure 12. Closure of switch 113 thus produces a forward movement of the tape, and during the reproduction function, the prerecorded material on the tape is reproduced by microphone 15B acting as a speaker. While the tape is being thus moved forwardly and it is desired to condition the apparatus for recording, the switch 14 is momentarily closed manually. It will be observed that one terminal of switch 14 is connected to contact 4 and the other terminal of switch 14 is connected to contact 8. In the recording function, switch 14 in Figure 23 is thus equivalent to switch 39, 52, 54 in Figure 11 since they both serve to bridge the Jones plug contacts 4 and 8 and thus achieve the same functions and results. Closure of switch 14 in Figure 23 or switch 39, 52, 54 in Figure 11 conditions the apparatus for recording as previously described in that it causes a holding circuit to be established for recording through the switch H17, 18 of the listen-record relay H. This holding circuit then remains closed after opening of either switch 14 in Figure 23 or switch 39, 52, 54 in Figure 11; and this is so even while tape movement may be stopped and started using the manual switch 113 in Figure 23 or the manual switch 39, 52, 53 in Figure 11.

When it is desired to perform a rewind or backspace function, the switch 113 in Figure 23 (or switch 39, 52, 53 in Figure 11) is opened and then switch 14 in Figure 23 is manually closed (or switch 39, 50, 51 in Figure 11 is closed). Thus switch 14 is equivalent to switch 39, 50, 51 in the rewind function.

As demonstrated above, switch 14 (Figure 23) is equivalent to switch 39, 52, 54 in the recording function and is equivalent to switch 39, 50, 51 in the rewind function. These switches 39, 52, 54 and 39, 50, 51 are connected to the same points in the control circuit, i.e., contacts 50 and 54 are both connected to the same Jones plug contact 4; and contacts 51 and 52 are both connected to the same grounded Jones plug contact 8. The lamps 21 in Figure 11 and 15A in Figure 23 are each connected to the same Jones plug contacts and each serve when illuminated to indicate that the apparatus is in condition for recording.

The details of the switch 15 are now described in connection with Figures 2–5. This switch 15 is of special construction and is fastened by means of screw 100 to the microphone housing 14 in the nature of a conventional flashlight housing with the internal parts thereof removed to house the switch and the microphone 37. The switch 15 has a pair of stationary inwardly extending end members 102 and 103 on which one end of the springs 55 and 56 are affixed as, for example, by soldering so that the other ends of the springs 55 and 56 may be engaged by the knob 39A, such knob 39A being mounted for slidable movement in the U-shaped member 105 to which is attached the aforementioned end pieces 102 and 103. An insulated base member 106 (Figure 5) is mounted on the element 105 and carries the series of contacts 50, 51, 52, 53 and 54 engageable with the contactor 39. The contactor 39 is recessed within the knob 39A and is spring biased downwardly in Figure 4 by the coil compression spring 107 so that such contactor 39 makes positive contact with the aforementioned contacts.

As shown in Figure 4, the switch is in its so-called run position and the spring 56, in such condition, touches the knob 39A lightly or is spaced a very small distance therefrom so that such knob 39A may be maintained in the position illustrated in Figure 4 without manual effort. On the other hand, the spring 55 in Figure 4 is spaced a considerable distance away from the knob 39A so that considerable movement of the knob 39A to the left is required before starting to compress the spring 55. The spring 56 is compressed when and as the knob 39A is moved to the right in Figure 4 to bring the contactor 39 into engagement with the raised contact 54. Manual effort is required to maintain the contactor 39 in engagement with such contact 54 so that when the knob 39A is released, the spring 56 moves the contactor 39 away from the raised contact 54.

Preferably, the contactor 54 is raised, as shown in Figure 4, to limit movement of the contactor 39 and knob 39A but, while this construction is preferable, it is not necessary. The use of a raised contact 54 is also preferred since, in certain condition of operation, as illustrated in Figure 14, the contactor 39 is required to engage three contacts, namely, contacts 52, 53, and 54. If these contacts were all flat contacts, there is a possibility, due to wear, mechanical misalignment or otherwise, that the contactor 39 would bridge only two of such contacts instead of three as required. By using the raised contact 54, only two flat contacts 52 and 53 are required, thereby avoiding possible trouble and expensive manufacture.

The aforementioned spring 55 is compressed when the contactor 39A is moved to its position shown in Figure 13 wherein such contactor 39 engages the contacts 50 and 51. Since the spring 55 is compressed in this particular condition, manual effort is required to maintain the contactor 39 in the position shown in Figure 13 so that release of the knob 39A causes the contactor 39 to move to the off position illustrated in Figure 15. In other words, the knob or contactor 39 may be self-maintained in either the off position illustrated in Figure 15 or the run position indicated in Figures 4 and 12. For this purpose, sufficient frictional forces are present between slidably mounted knob 39A and the switch casing or element 105 to allow the contactor 39 to be self-maintained in such off and run positions.

As alluded to above, the spacing between contacts 53 and 54 on the one hand is smaller than the distance, on the other hand, between contacts 50 and 51 so that in one extreme position the contactor 39 engages three contacts 52, 53, and 54 while in the other extreme position only two contacts are engaged by the contactor 39, namely, the contacts 50 and 51. Motion of the knob 39A to such extreme positions is limited by engagement of the outwardly extending portion of the knob 39A with the side walls defining the apertured portion 110 of the switch casing 105.

For reasons mentioned above, the spring 56 is preferably a stronger spring than the spring 55. Although, as mentioned above, the accessories illustrated in Figures 1, 6 and 7 are fully interchangeable with the comparable accessories shown and described in my abovementioned copending application, for producing the same results, such accessories are useable not only in use of dictating machines involving magnetizable wire but, as demonstrated herein, are likewise useable in machines involving magnetizable tape.

Figure 18:
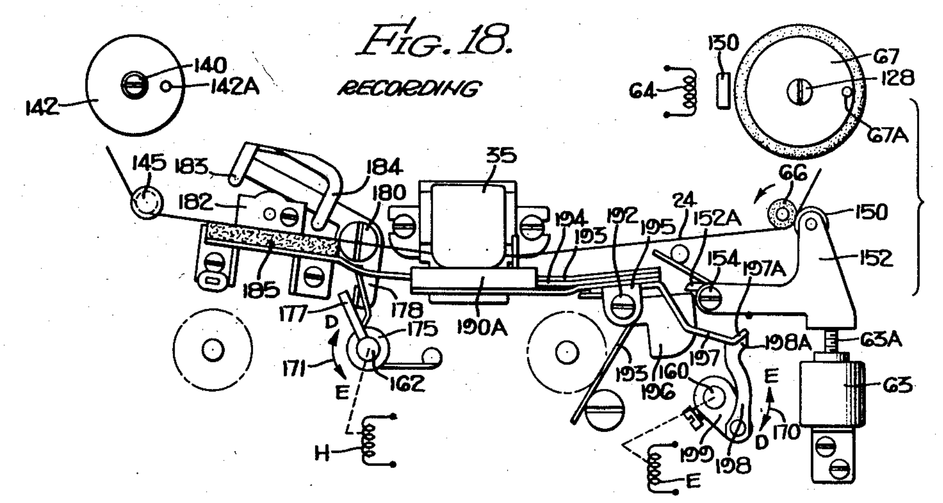
Figure 18 shows the apparatus illustrated in Figure 16 conditioned for recording.
Figure 19:
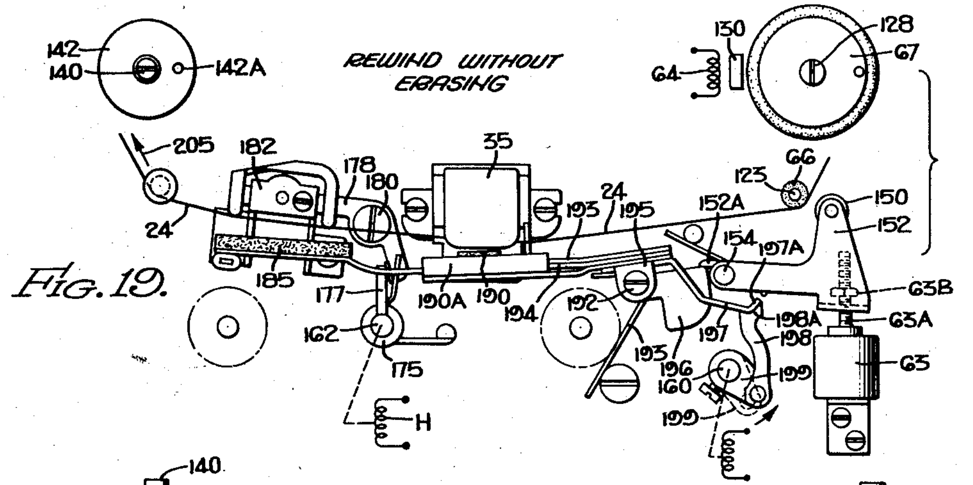
Figure 19 shows apparatus illustrated in Figure 16 conditioned for rewinding without erasing.
Figure 20:
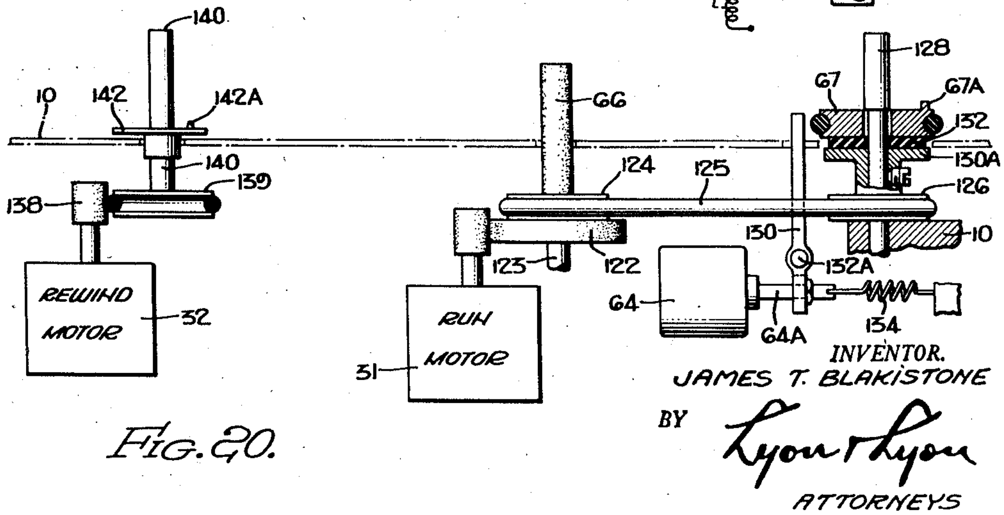
Figure 20 illustrates the operative relationship of the tape driving motor and rewind motor in relationship to the tape spools.

With reference now to the following detailed description of Figures 16–20, as shown in diagrammatic form in Figure 20, the aforementioned motors 31 and 32 and solenoids 63 and 64 and the relay E, energized and controlled as described above, are used to control the transport of tape in either direction of movement from the supply spool to the take-up spool and vice versa.

The run motor 31 is mounted in the cabinet 10 and serves, when energized, to drive the tape engaging capstan 66. For this purpose, the shaft of the motor engages the rubber puck 122 on the spindle shaft 123 which is rotatably mounted on the housing 10. A pulley 124 is mounted on shaft 123 and has over it a belt 125 for driving the sheave 126 on the suitably journaled shaft 128. This shaft 128 has secured thereto the disc 130 on which freely rests the friction disc 132, such friction disc 132 being sandwiched between, on the one hand, the driven disc 130 and the reel engaging mandrel 67 which is rubber rimmed and freely mounted concentrically on the spindle. As shown in Figure 20, in the absence of any braking force from brake arm 130, the mandrel 67 tends to rotate with the shaft 128 due to frictional coupling between disc 130A transmitted to mandrel 67 by friction disc 132. The upward extension of 128 through the mandrel 67 allows the take-up tape reel 26 (Figure 1) to be mounted thereon. Mandrel 67 has an upwardly extending pin 67A engageable with conventional apertured portion of the take-up spool 26 for positively connecting reel 26 to mandrel 67. Reel 26 may be stopped independently of the shaft 128, using a braking mechanism involving the solenoid 64. The solenoid 64 has its movable plunger 64A engageable with one end of the brake lever 130, such brake lever 130 being pivoted about the axis of the shaft 132A. The brake lever 130 extends upwardly adjacent the rubber rimmed mandrel 67 and is normally held away from the mandrel 67 by the coil tension spring 134. However, when the stationarily mounted solenoid 64 is energized, the brake lever 130 is rotated in the clockwise direction in Figure 20 to engage the rubber rimmed mandrel 67 so as to prevent movement of the mandrel 67 and the take-up reel releasably secured thereto by means of the locking pin 67A.

Thus, in order that the take-up spool may run, it is necessary that the solenoid 64 remain de-energized.

The rewind motor 32 is mounted in the cabinet 10 and has a roller 138 mounted on its shaft in engagement with the rubber rimmed disc 139 fixed on shaft 140, such shaft 140 being journaled for rotation on the cabinet 10. Such shaft 140 has a disc 142 affixed thereto, such disc having a pin 142A engageable with the conventional apertured portion of the supply spool or reel intended to rest on the disc 142 with the shaft 140 extending upwardly therethrough, as shown in Figure 1. Either one of the motors 31 or 32 may be energized as described above. When the motor 31 is energized and the mandrel 67 is freed by brake arm 130 to take up tape pulled through the tape channel by the pressure roller 150 pressing tape 24 against rotating capstan 66, the shaft 140 is rotated by the pull exerted on the tape, which is assumed to extend between the supply and take-up reels; and in such case, there is sufficient drag produced by the friction in the drive system associated with the motor 32 to provide sufficient tautness in the tape to allow starting and stopping of the tape without movement of the tape becoming fouled. On the other hand, when the motor 32 is energized during the rewind operation, sufficient resistance is imparted to movement of the tape by frictional forces on mandrel 67 developed by friction disc 132 to prevent tape back-lash during rewind, while heavy engagement of the brake lever 130 with the rubber rimmed mandrel 67 brings the rewind function to a quick stop without back-lash on energization of solenoid 64 and simultaneous de-energization of motor 32. In other words, during the rewind operation, the solenoid 64 is de-energized to remove the brake lever 130 from engagement with the rubber rimmed mandrel 67.

Referring now to Figures 16–19, the tape 24 is movable between the supply spool 25 and the take-up spool 26, or vice versa. The tape in such movement passes through a tape channel defined generally by the capstan 66, the transducer 35 which is a combination recording and play-back head, and the stationary spindle 145. This tape channel is shown in its open position in Figure 19, in which condition the tape may be conveniently inserted and removed, as desired. This is the condition of the tape channel when in "stop" position after having just used the "rewind" function. It is noted that motors 32 and 31 are both at rest as well as are spindles 128 and 140 and mandrel 67 to allow easy threading.

The tape 24 is moved in its forward direction, i.e., onto the supply spool 26, only when the roller 150 is in position to press the tape against the motor-driven capstan 66 as represented in Figures 16 and 18. This roller 150 is rotatably supported on an arm 152 which is mounted for pivotal movement about the axis of the pivoting post 154. Such arm 152 is biased for counter-clockwise movement in Figure 16 by a torque spring 158 which thereby biases the roller 150 in the direction of the capstan 66. The roller 150 may be moved away from the capstan 66 by either one of two expedients, namely, first by energizing the solenoid 63 or, second, by engaging the extension 152A of arm 152 and moving the same using apparatus described in detail later. Solenoid coil 63 is stationarily mounted on the cabinet 10 and has its armature 63A threaded to receive the stop nut 63B. The extension of armature 63A passes through an apertured portion of the arm 152 and is free to move therein, but when the solenoid 63 is energized, the nut 63B thereon engages and moves the arm 152 in the clockwise direction about the pivoting axis of the post 154 to move the roller 150 to its retracted position illustrated in Figure 17. When the condition illustrated in Figure 17 exists, no movement of the tape 24 is produced.

Thus, as outlined previously, repeated starting and stopping of the tape when in either the recording or dictation function, involves de-energizing and energizing of the solenoid 63 (and simultaneous de-energization and energization of the solenoid 64, Figure 20).

The aforementioned rotary relays illustrated in Figure 10 having the windings E and H are of the rotary type having rotating shafts. These shafts, besides producing a switching operation, are used also to produce mechanical movement of elements associated with the tape channel. For purposes of identification, the shaft which is rotated upon energization of the "run-rewind" relay winding E has the reference numeral 160; and the shaft which is rotated upon energization of the winding H has the reference numeral 162. Such shafts 160 and 162 are illustrated in Figure 10 and Figures 16–19. It is understood that these rotary relays are two position relays having means such as spring means urging their respective shafts to hold the switching elements in their normal positions, from which they are moved to the second position upon energizaiton of the associated coil. The shaft 160 is shown in Figure 18 in the position it assumes when the coil E is de-energized; and, similarly, the shaft 160 assumes the position illustrated in Figure 19 when the associated coil is energized.

Likewise, in Figures 16, 17 and 19 the shaft 162 associated with the coil H is shown in the position it assumes when such coil H is de-energized; and Figure 18 shows the shaft 162 in the position it assumes when the coil H is energized. The arrows 170 and 171 in Figure 18 serve to indicate the movement in which the shafts 160 and 162, respectively, are moved when the closing coils E and H are energized, the letter E associated with the arrows signifying that the associated coil is energized and the letter D signifying that the associated coil is de-energized.

The shaft 162 has secured thereto a bushing 175 which in turn mounts the pin 177. This pin 177 is engageable with one end of an arm 178, such arm 178 being mounted for pivotal movement at a point intermediae its ends about the axis of the pivot post 180. The other end of the arm 178 is generally U-shaped and is adapted to straddle a stationarily mounted erasing magnet 182. For this purpose the arm 178 has integrally formed therewith the two upstanding tape engaging portions 183 and 184 for engaging the tape 24 and to move such tape away from the erase magnet 182 in the conditions illustrated in the Figures 17, 16, and 19. The erasing means 182 is stationarily mounted so that the tape passing around, on the one hand, the post 145 and on the other hand, the capstan 66 engages such magnet 182 and in order to assure the placement of the tape in immediate contact with the magnet 182 an auxiliary pressure pad 185, mounted as described later is provided to bias such tape into engagement with the magnet 182. However, this biasing force is overcome when the shaft 162 is moved from its position shown in Figure 18 to its position shown in either Figures 16, 17 or 19, occasioned by de-energization of the associated relay winding H. Thus, while in Figure 18 the material on the tape passing the erase magnet 182 is erased, erasing is prevented when the conditions illustrated in Figures 16, 17 and 19 exist, i.e., when the arm 178 is positioned to move the tape 24 away from the erase magnet 182.

Movement of the aforementioned shaft 160 associated with coil E controls, in general, the movement of two pressure pads, namely, the aforementioned pressure pad 185 and the pressure pad 190, the humshield 190A, and the pressure roller assembly 152. The pressure pad 190 serves to positively press the tape 24 against the head of the transducer 35 while the pressure pad 185 tends to move the tape 24 in the direction of the erase magnet 182. The humshield 190A shields the transducer 35 from extraneous magnetic fields. The pressure pads 185 and 190 and the humshield 190A are mounted for rotation about a common axis, namely, the axis of the pivoting post 192, around which a torque spring 193 is wound to normally bias the arm 194 carrying such pressure pads 185 and 190 and humshield 190A in the clockwise direction in Figure 16. Pressure pad 190 is mounted on one end of a flexible metallic strip 193, the pressure plate pad is mounted on one end of the flexible strip 194, adjacent ends of both arms 193 and 194 being affixed to the spindle 195. This spindle 195 has also attached thereto a plate 196 engageable with the aforementioned extension 152A of arm 152 for purposes described later. This spindle 195 has also affixed thereto an actuating arm 197 that terminates, as shown in Figure 18, in a V-shaped end portion 197A adapted to seat within a cooperating V-shaped portion 198A of an arm 198. This arm 198 is secured to a crank arm 199 on shaft 160. Thus, counterclockwise rotation of the shaft 160 results in movement of the pressure pads 185 and 190 and humshield 190A and pressure roller assembly arm 152 and opens to allow free movement of the tape during rewind or insertion or removal of the tape in "stop" following rewind.

Figure 16 represents the condition wherein the tape is being moved from the supply spool to the take-up spool in accomplishing a reproducing function and in such case, it is observed that the tape 24 is held away from the erase magnet 182 by the arm 178. Figure 17 illustrates generally the same conditions illustrated in Figure 16 but shows conditions wherein the solenoid 63 and the solenoid 64 associated with the brake arm 130 are both energized to prevent tape movement while yet otherwise allowing the apparatus to be in condition for reproducing. E and H are both de-energized.

Figure 18 illustrates generally the same conditions existing in Figure 18 but in this case the coil H is energized to allow the pressure pad 185 to press the tape 24 in engagement with the erase magnet 182 whereby the material on the tape may be erased by such magnet in the passage of the tape past such magnet. Thus, the condition represented in Figure 18 illustrates the recording function in that pre-recorded material is first erased by the magnet 182 and new material may be freshly recorded by energizing the transducer 35 with voice currents. Once the condition illustrated in Figure 18 exists, the movement of the tape 24 may be stopped and started by moving contactor 39 between positions illustrated in Figures 15 and 12 without de-energizing H, i.e., without going out of the recording function. This simply energizes or de-energizes solenoids 63 and 64 as described in detail above. Thus, during the recording function, the movement of the tape may be started and stopped at will without going out of the recording function.

Figure 19 represents the condition where rewinding is accomplished without erasing, i.e., the tape is being moved from the take-up spool to the original supply spool with the tape 24 moving in the direction indicated by the arrow 205. Under this condition the coil E associated with shaft 160 is energized to move the pressure pads 185 and 190 and humshield 190A away from the erase magnet 182 and transducer 35 to open that portion of the tape channel, thus allowing the tape to more freely move therein. Also, such movement of shaft 160 causes the arm 196 to engage the extension 152A of the arm 152 to move the pressure roller 150 a greater distance away from the capstan 66 than would be accomplished by energization of solenoid 63 to complete the operation of the opening of the film channel. At the same time, during this rewind operation, it is observed that neither solenoid 63 nor 64 is energized but friction disc 132 engaging the rubber rimmed mandrel 67 creates frictional forces preventing backlash of the tape. This condition illustrated in Figure 19 is accomplished, for example, using the foot switch assembly shown in Figure 6 and closing the rewind switch 19, or by closing the local rewind switch RE associated with the knob 30 (Figures 1 and 10) or moving 39A to position shown in Figure 13.

It is noted that in connection with Figures 17 and 20 the pressure roller 150 is positioned a greater distance away from the capstan 56 in Figure 20 than is such roller spaced from the capstan 56 in Figure 17. This larger spacing in Figure 20 occasioned by the fact that the arm 196 causes the pressure roller 150 to be moved, allows a greater convenience in threading and removing the tape as the case may be; whereas the closer spacing in Figure 17, occasioned by energization of the solenoid 63 is desirable in normal operation of the machine wherein the tape is started and stopped since, in this instance, the roller 150 need move only a relatively small distance with respect to the capstan 56 in performing the functions of starting and stopping the tape, thereby allowing the solenoid 63 to be of relatively small size and one which causes only a relatively small amount of noise in operation.

Thus, the above description of the operation of the tape recorder represents also, the application of the inventions defined in my above copending application in illustrating the technique of applying those inventions to tape. By the same token, the inventions defined in my copending application are shown to be applicable to recorders using magnetic tape; and, it is considered that these inventions defined in my pending applications are applicable not only to magnetizable tape and magnetizable wire, but also to machines in which the recording medium may be in the form of wide magnetic endless belts.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a recorder of the character described, recording media transport means, recording media backspacing means, a combination reproducing and recording head, means conditioning said head for recording, means normally conditioning said head for reproducing, a first switch operable to actuate said transport means to effect reproductions, a second switch operable only when said first switch is actuated to actuate said recording conditioning means, a third "off" switch operable to prevent operation of said backspacing and said transport means, said second switch being effective to actuate said backspacing means when said first switch is in non-actuated position, and a single common operating member for said first switch, said second and said third switch.

2. In a recorder of the character described, recording media transport means, recording media backspacing means, a combination reproducing and recording head, means normally conditioning said head for reproducing, means conditioning said head for recording, an electrical control circuit incorporating each of the aforementioned means, said control circuit including a connector adapted to receive a recording connector having first circuit means connected thereto, a transcribing connector having second circuit means connected thereto, an erase connector having third circuit means connected thereto, said erase connector when in operative position cooperating with said control circuit and being effective to operate said backspacing means and said recording means, said transcribing connector cooperating with said control circuit and when in operative position being effective to alternatively operate said transport means or said backspacing means, said recording connector cooperating with said control circuit and when in operative position being effective to control alternatively said transport means or backspacing means and to control said recording and reproducing means, means normally connected to said recording connector comprising switching means with a single operating member for controlling alternatively said transport means, backspacing means and said recording and reproducing means.

3. In a recorder of the character described, recording media transport means, recording media backspacing means, a combination recording and reproducing head, means normally conditioning said head for reproducing, a first manually operable switch for effecting operation of said transport means, a second manually operable switch normally effective to control the operation of said backspacing means, means operable upon actuation of said first switch to render ineffective control of said backspacing means by said second switch, a third "off" switch operable to prevent operation of said backspacing and said transport means, means operable upon actuation of said first switch for rendering said second switch effective to operate said recording means, and said first, second and third switches incorporating a single common operating member.

4. In a recorder of the character described, recording media transport means, recording media backspacing means, a combination recording and reproducing head, means normally rendering said head effective for reproducing, means conditioning said head for recording, a first manually operable switch effective to operate said transport means whereby a recording is reproduced, a second manually operable switch effective after operation of said first manually operable switch to render said reproducing means ineffective and to actuate said recording means, a third "off" switch operable to prevent operation of said backspacing and said transport means, said second switch being effective when said first switch is in its unactuated position to operate said backspacing means, and said first, second and third switches being operated by a single common member.

5. In apparatus of the character described, means for producing a reproducing function, means for producing a backspacing function, means for producing a recording function, means for starting and stopping movement of a recording medium, a single manually controlled member controlling each of the four aforementioned means, said control member comprising a switch having a series of relatively stationary contacts and a relatively movable contact adapted to contact selected ones of said stationary contacts, said control member including a knob for moving said relatively movable contact, a housing, said knob being slidably mounted in said housing, a spring engageable with said knob for movement of said knob in a first direction, a second spring engageable with said knob when said knob is moved in the opposite direction, said knob being movable between said two springs a relatively small distance to alternatively start and stop said recording medium without engaging either of the two springs.

6. In a recorder of the character described, recording media transport means, recording media backspacing means, a combination reproducing and recording head, means conditioning said head for recording, means normally conditioning said head for reproducing, a first switch operable to actuate said transport means to effect reproductions and to prevent operation of said transport means, a second switch, operable only when said first switch is actuated, to actuate said recording conditioning means, said second switch being effective to actuate said backspacing means when said first switch is in non-actuated position.

7. In a recorder of the character described, recording media transport means, recording media backspacing means, a combination recording and reproducing head, means normally conditioning said head for reproducing, means conditioning said head for recording, a first manually operable switch for effecting operation of said transport means or for preventing operation of said transport means, a second manually operable switch normally effective to control the operation of said backspacing means, means operable upon actuation of said first switch to render ineffective control of said backspacing means by said second switch, means operable upon actuation of said first switch for rendering said second switch effective to operate said recording means.

8. In a recorder of the character described, recording media transport means, recording media backspacing means, a combination recording and reproducing head, means normally rendering said head effective for reproducing, means conditioning said head for recording, a first manually operable switch effective to operate said transport means or to prevent operation of said transport means, whereby a recording is reproduced, a second manually operable switch effective after operation of said first manually operable switch to render said reproducing means ineffective and to actuate said recording means, said second switch being effective, when said first switch is in its unactuated position, to operate said backspacing means.

9. In a recorder of the character described, a recording media transport means, a recording media backspacing means, a recording and a reproducing head, means normally conditioning said reproducing head for reproducing, means conditioning said recording head for recording, said transport and backspacing means each including respectively a run and a rewind solenoid, said recording and reproducing means including a dictation solenoid for rendering said reproducing and recording means alternatively effective, means including a run relay effective, when energized, to energize said run solenoid, a rewind relay effective, when energized, to energize said rewind solenoid, a dictation relay effective, when energized, to energize said dictation solenoid, a first manually operable switch controlling energization of said run relay, a second manually operable switch, said run relay having a normally closed switch through which said rewind relay may be energized through said second manually operable switch, said relay switch, upon energization of said run relay, being opened to prevent energization of said rewind relay by said second manually operable switch, and means for energizing said dictation relay by said second manually operable switch only when said first-manually operable switch is actuated.

10. In a recorder of the character described, recording media transport means, recording media backspacing means, a recording and a reproducing head, means normally conditioning said reproducing head for reproducing, means conditioning said recording head for recording, said reproducing and recording means including a dictation solenoid, a dictation relay connected to and controlling the operation of said dictation solenoid, said transport means including a run solenoid, said backspacing means including a rewind solenoid, a run relay connected to and controlling the operation of said run solenoid, a rewind relay connected to and controlling the operation of said rewind solenoid, each of said relays being connected to a common connector, a transcription connector connected to said common connector and having terminals thereof connected to first and second manually operable switches, one of said switches being effective to energize said run relay and the other one of said switches being effective to energize said rewind relay through a normally closed switch of said run relay.

11. In a recorder of the character described, recording media transport means, recording media backspacing means, a reproducing and a recording head, means normally conditioning said reproducing head for reproducing, erase means, means including said erase means for conditioning said recording head for recording, an electrical control circuit incorporating each of the aforementioned means, said control circuit including a common connector adapted to alternatively receive either a recording connector having first circuit means connected thereto, or a transcribing connector, having second circuit means connected thereto or an erase connector having third circuit means connected thereto, said erase connector, when in operative position cooperating with said control circuit and being effective to operate jointly said backspacing means and said erase means, said transcribing connector cooperating with said control circuit and when in operative position, being effective to alternatively operate either said transport means or said backspacing means, said recording connector cooperating with said control circuit and when in operative position, being effective to control alternatively said transport means or backspacing means and to control said recording and reproducing means.

12. In a recorder of the character described, recording media transport means, recording media backspacing means, a recording and a reproducing head, means normally conditioning said reproducing head for reproducing, means conditioning said recording head for recording, said reproducing and recording means including a dictation solenoid, a dictation relay connected to and controlling the operation of said dictation solenoid, said transport means including a run solenoid, said backspacing means including a rewind solenoid, a run relay connected to and controlling the operation of said run solenoid, a rewind relay connected to and controlling the operation of said rewind solenoid, each of said relays being connected to a common connector, a recording connector connected to said common connector, said recording connector having a pair of terminals thereon to which a first manually operable switch is connected, said first manually operable switch being effective to energize said run relay, said recording connector having a second manually operable switch connected to terminals thereof, said second manually operable switch being normally effective to energize said rewind relay through a normally closed switch on said run relay, and said second manually operable switch being effective, only upon simultaneous actuation of said first manually operable switch, to energize said dictation relay.

13. In a recorder of the character described, recording media transport means, recording media backspacing means, a recording and a reproducing head, means normally conditioning said reproducing head for reproducing, means conditioning said recording head for recording, said recording means including erase means, said reproducing and recording means including a dictation solenoid, a dictation relay connected to and controlling the operation of said dictation solenoid, said transport means including a run solenoid, said backspacing means including a rewind solenoid, a run relay connected to and controlling the operation of said run solenoid, a rewind relay connected to and controlling the operation of said rewind solenoid, each of said relays being connected to a common connector, an erasing connector connected with said common connector, said erasing connector having terminals thereof interconnected to effect operation of said rewind relay and said dictation relay whereby the recording media is simultaneously backspaced and recordings thereon are erased by said erase means.

14. In apparatus of the character described wherein a recording media is moved relative to a transducer means, first means conditioning said transducer means for recording, second means normally conditioning said transducer means for playback of a previous recording, third means for maintaining said recording means effective, fourth means for changing the relative position of said transducer means with respect to said recording media to reposition said transducer means adjacent a previous recording, fifth means for disabling said maintaining means upon operation of said changing means, and means rendering said playback means effective automatically after said changing means is operated, and means for starting and stopping movement of said recording medium when either said playback or said recording means is effective.

15. In apparatus of the character described wherein recording media is moved relative to transducer means to effect a recording on said recording media, first means for changing the relative position of said transducer means with respect to the said recording media to position said transducer means adjacent a previous recording, second means normally conditioning said apparatus for effecting playback of a previous recording, third means for rendering said playback means effective automatically after operation of said positioning means, recording means, a common energizing circuit for said first, second and third means as well as said recording means, said recording means being rendered ineffective and said second means being rendered effective upon interruption of said common energizing circuit, and means for starting and stopping movement of said recording medium when either said playback means or said recording means is effective.

16. In apparatus of the character described wherein a recording medium is moved forwardly relative to transducer means for effecting either playback or recording and there is relative movement between the medium and the transducer means for effecting backspacing, recording medium transport means for moving said medium forwardly, a first manually operated switch having an "on" position and an "off" position for operating said transport means to start and stop forward movement of said medium, playback means normally effective to playback recordings upon operation of said first switch to its "on" position, recording means normally ineffective to produce a recording on said medium, a second manually operated switch, electrical circuitry including said first and second switches for rendering said recording means effective and said playback means ineffective upon operation of said second switch only when said first switch is in its "on" position, and said first switch being effective to start and stop forward movement of said medium when either said playback means or said recording means is effective.

17. Apparatus as set forth in claim 16 including backspacing means, and said circuitry including means whereby said backspacing means is operated upon operation of said second manually operated switch only when said first switch is in its "off" position.

18. Apparatus as set forth in claim 17 in which said circuitry includes means whereby said recording means, if it had been previously rendered effective upon prior operation of said second manually operated switch, is rendered ineffective upon subsequent operation of said second switch.

19. Apparatus as set forth in claim 18 including erasing means, a pair of complementary plug means for quickly attachably and detachably connecting said first and second switches to said circuitry, and second plug means having circuitry wired thereon effective automatically upon insertion of said second plug means into one of said complementary plug means for simultaneously operating said backspacing means and said erasing means.

20. Apparatus as set forth in claim 17 including a pair of complementary plug means for quickly attachably and detachably connecting said first and said second switches to said circuitry, second plug means insertable into one of said complementary plug means and having a pair of manually operated switches thereon for operating alternatively only said transport means and said backspacing means and without operating said recording means.

21. Apparatus as set forth in claim 16 in which said first and second switches are operated by a common actuating member.

22. Apparatus as set forth in claim 16 in which said first and second switches are operated separately and independently.

23. Apparatus as set forth in claim 16 in which said second manually operated switch includes means for biasing the same in a position requiring manual effort on the part of the operator to operate the same for rendering said recording means effective.

24. In apparatus of the character described wherein a recording medium is moved forwardly relative to transducer means for effecting either playback or recording and there is relative movement between the medium and the transducer means for effecting backspacing, recording medium transport means for moving said medium forwardly, backspacing means, recording means, a first manually operated switch having two positions, electrical circuitry connecting said switch for operating said transport means to start and stop movement of said medium, a second manually operated switch connected to said circuitry, said circuitry including means whereby operation of said second switch with said first switch in one of its positions operates said recording means and operation of said second switch with said first switch in the other one of its positions operates said backspacing means.

25. Apparatus as set forth in claim 24 in which said second switch includes biasing means for returning it to its non-actuated condition upon manual release and said circuitry includes means whereby said recording means remains effective after manual release of said second switch.

26. Apparatus as set forth in claim 24 in which said second switch includes biasing means for returning it to its non-actuated condition upon manual release and said circuitry includes means whereby said backspacing means is rendered inoperative upon release of said second switch.

27. In apparatus of the character described wherein a recording medium is moved forwardly relative to transducer means for effecting either playback or recording and there is relative movement between the medium and the transducer means for effecting backspacing, recording medium transport means for moving said medium forwardly, recording means, backspacing means, a first manually operated switch having an "on" position and an "off" position for operating said transport means to start and stop movement of said medium, and manually operated switching means effective to operate said recording means when said first switch is in said "on" position and effective to operate said backspacing means when said first switch is in its "off" position.

28. Apparatus as set forth in claim 27 in which said manually operated switching means includes a manually operated switch which is operated separately and independently of said first switch.

29. Apparatus as set forth in claim 27 in which said manually operated switching means includes a pair of switches having their contacts connectable in parallel by a common operating member which also operates said first switch.

References Cited in the file of this patent

UNITED STATES PATENTS

| | | |
|---|---|---|
| 909,414 | Hytten | Jan. 12, 1909 |
| 2,279,753 | Knopp | Apr. 14, 1942 |
| 2,356,421 | Morse | Aug. 22, 1944 |
| 2,504,587 | Rey | Apr. 18, 1950 |
| 2,536,666 | Somers | Jan. 2, 1951 |
| 2,563,545 | Moreland et al. | Aug. 7, 1951 |
| 2,572,596 | Camras | Oct. 23, 1951 |
| 2,683,193 | Barcus | July 6, 1954 |
| 2,713,618 | McNabb | July 19, 1955 |